Sept. 1, 1970     L. R. COKER ET AL     3,526,382
QUICK DISCONNECT LATCH AND HANDLE COMBINATION
Filed July 15, 1968
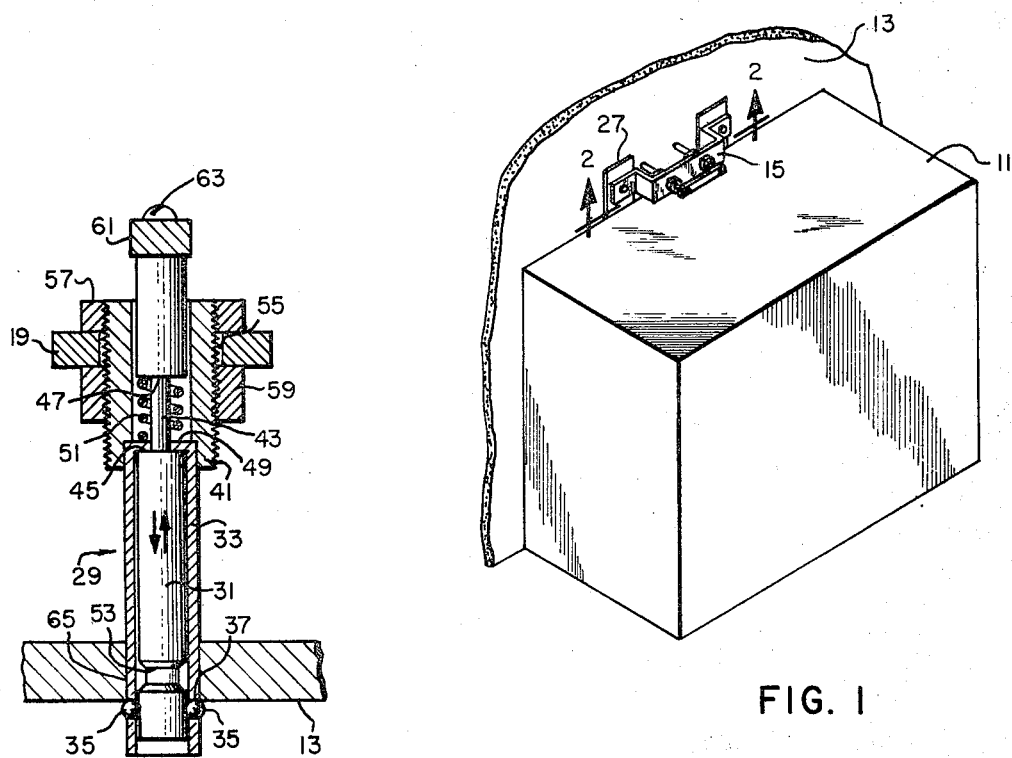
FIG. 1
FIG. 3
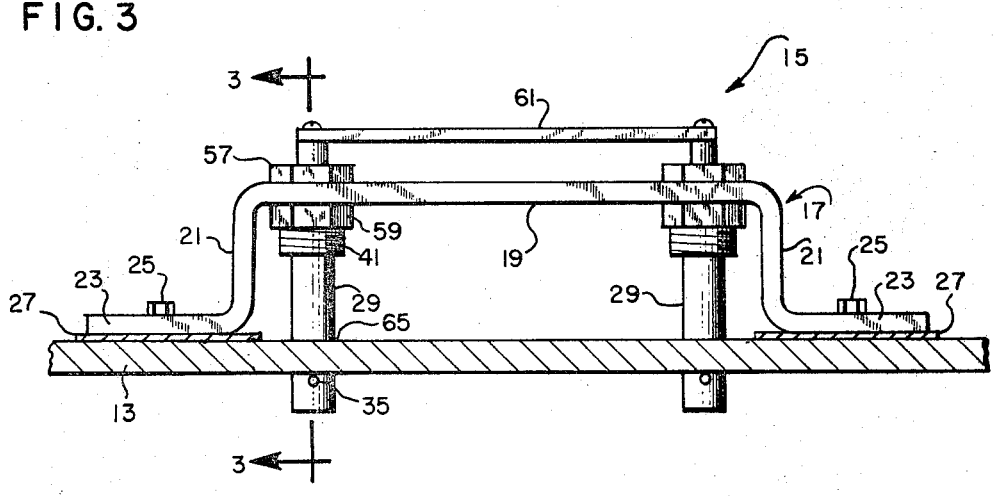
FIG. 2
LEWIS R. COKER,
CHARLES A. MACKAY
*INVENTORS*
BY
*ATTORNEYS*

United States Patent Office 3,526,382
Patented Sept. 1, 1970

3,526,382
QUICK DISCONNECT LATCH AND HANDLE COMBINATION
Lewis R. Coker, Madison, and Charles A. MacKay, Huntsville, Ala., assignors to the United States of America as represented by the Administrator of the National Aeronautics and Space Administration
Filed July 15, 1968, Ser. No. 744,910
Int. Cl. B65d 25/28
U.S. Cl. 248—360                                7 Claims

ABSTRACT OF THE DISCLOSURE

A quick disconnect latch and handle combination for mounting an article, such as an equipment container, on a wall or other supporting base. The device attaches to the article, provides a handle for manipulating the article, and a latch that engages within holes in the supporting base to secure the article thereon. The latch mechanism is operated with the hand while gripping the handle.

The invention described herein was made by employees of the United States Government and may be manufactured and used by or for the Government for governmental purposes without the payment of any royalties thereon or therefor.

BACKGROUND OF THE INVENTION

This invention relates generally to latching devices and more particularly to a combination latch and handle device for mounting an article on a wall or other supporting surface.

One aspect of the development and planning for manned space flights of long duration in large spacecraft is that of stowing and mounting the variety of equipment and supplies required for such flights. The weightless environment of such flights requires that all articles be secured in some manner. Many of the articles, such as containers for supplies or equipment for experiments and other needs, will require frequent mounting and dismounting of the containers and components, and these various articles will be mounted on walls of the spacecraft or other supporting surfaces.

A means for quickly and conveniently mounting and dismounting these articles during the flight is required and this means should also incorporate a handle for manipulating the article while it is dismounted from its anchoring surface. Conventional fasteners such as nuts and bolts require an undue amount of time and effort for mounting and dismounting, and also involve the use of tools. In addition, such fasteners have the disadvantage of requiring both hands of the astronaut for installation and removal.

SUMMARY OF THE INVENTION

The invention comprises a combination latch and handle device that is adapted for attachment to an article, and includes means for securing the article on a wall or other supporting surface. The device includes a frame element that attaches to the article to be secured, and the frame supports a pair of locking pins adapted to lock within holes in a wall or other supporting surface. Arranged parallel with the main body portion of the frame is a control bar that actuates the locking pins. The control bar is spring urged in the locked position and the lock may be released by holding the frame member as a handle and pressing the control bar thus releasing the latch mechanism and the article to which it is attached. Subsequently the article may be carried by the handle provided by the frame.

Accordingly, it is a general object of the present invention to provide an improved quick release combination latch and handle device.

A more specific object of the invention is to provide a latch and handle mechanism that is adapted to be attached to an article, such as a container, and detachably mount the article on a well or other supporting surface in a quick and convenient manner.

Another object of the invention is to provide a device for anchoring equipment and supplies in the weightless environment in a spacecraft so that the articles may be released and anchored quickly and easily with the use of one hand of the astronaut.

These and other objects and advantages of the invention will become apparent upon reference to the following specification, attendant claims and drawing.

BRIEF DESCRIPTION OF THE DRAWING

FIG. 1 is a perspective view showing a container mounted on a wall with a quick disconnect latch and handle device;

FIG. 2 is a cross-sectional view taken along line 2—2 of FIG. 1 showing a side view of the quick disconnect latch;

FIG. 3 is a cross-sectional view of a locking pin of the latch of FIG. 2 taken along line 3—3 of FIG. 2.

DESCRIPTION OF THE PREFERRED EMBODIMENT

Referring to FIG. 1 a container 11 is shown mounted on a wall surface 13 by a quick disconnect latch and handle combination 15 embodying the present invention. The container 11 may contain any type of equipment or supplies that would be needed, for example, in a spacecraft. The latch 15 provides a convenient and quick means for mounting container 11 on the wall 13 and for dismounting the container therefrom.

Referring to FIG. 2, the latch 15 comprises a frame 17 having an elongated body portion 19 with opposed legs 21 integral therewith. Oppositely extending connecting flanges 23 are integral with the legs 21. Each of the connecting flanges 23 is joined as by screws 25 to flanges 27 which are joined to the container 11. Extending through the body portion 19 of the frame 17 are a pair of ball locking pins 29.

As shown in FIG. 3, each of the locking pins 29 comprises a plunger 31 adapted to reciprocate within a tube or cylinder 33 that carries a pair of locking balls 35 within apertures 37. The apertures 37 are reduced in diameter at their outer ends to prevent the balls 35 from escaping from the cylinder 33. An externally threaded sleeve 41 is fitted over the upper end of the cylinder 33 and secured by a friction fit or bonding to the cylinder 33. The lower end of the sleeve 41 has an enlarged inside diameter to receive the cylinder 33. The plunger 31 has a reduced diameter portion 43 near its upper end providing a stop abutment 45 and a spring surface abutment 47. The cylinder 33 has a constricted upper end 49 through which the reduced diameter portion 43 of the plunger 31 extends and slides.

Between the upper end of the cylinder 33 and the spring abutment surface 47 is a compression spring 51 that urges the plunger 31 toward its retracted position shown in FIG. 3. Near the lower end of the plunger 31 is an annular groove 53 that is adapted to register with the balls 35 when the plunger is pressed downwardly to permit the balls to withdraw from their locking position.

The externally threaded sleeve 41 passes through an opening 55 in the body portion 19 of the frame element 17 and the upper and lower nuts 57 and 59 threadedly engage the sleeve 41 to clamp the locking pin in place on the frame element 17.

The pair of plungers 31 are actuated simultaneously by a control bar 61 that extends from one locking pin to the other, being joined to the respective ends of the plungers by screws 63. When the control bar 61 is pressed, as by the palm of the hand, the plungers 31 slide within the cylinders 33 compressing the springs 51. The sliding movement of the plungers is limited in the downward motion by the stop shoulders 47 compressing the springs 51. The stop position coincides with the position where the locking balls 35 may recede into the annular groove 53 in the plunger 31. When the balls 35 recede the pins 29 may then be inserted into or withdrawn from spaced apertures 65 in the wall 13.

The projecting length of the pins are adjusted to the particular wall thickness so that when the pins 29 are inserted into the apertures 65 and the connecting flanges 27 contact the wall the locking balls 35 are located just beyond the back surface of the wall. The bar 61 is then released permitting the plungers 31 to retract under force of the springs 51 and causing the locking balls to be cammed outwardly and maintained in the locking position that prevents the balls from retracting into the cylinders 33. Thus the equipment latch is locked on the wall 13 and provides a mounting for the container 11.

The adjustment in the projecting length of the locking pins 29 for different wall thicknesses is made possible by the nuts 57 and 59. Varying the position of these nuts on the threaded sleeve 41 adjusts the distance the pins 29 project beyond the connecting flanges 27 so that the locking balls will be cammed into the locking position when the balls are just beyond the back surface of the wall. This avoids "play" between the locking balls and the wall back surface.

When it is desired to remove the container 11 from the wall this is easily accomplished with the use of one hand grasping the frame element 17 and pressing the control bar 61 with the palm of the hand to permit the locking balls to retract and allow withdrawal of the locking pins 29 from the wall 13. After the latch 15 is removed from the wall it provides a handle by which to carry the container 11.

We claim:

1. A combination latch and handle device for securing an article on a supporting surface and for handling the article when it is dismounted comprising:
   (a) a frame having an elongated body portion adapted to be engaged as a handle;
   (b) said frame supporting a plurality of locking pins spaced longitudinally of said portion and projecting substantially perpendicularly from one side of said portion;
   (c) each of said locking pins adapted to extend into an opening in a supporting surface and having locking and unlocking means for selectively preventing or permitting withdrawal of said pins from an opening;
   (d) said locking and unlocking means of each of said pins comprising a plunger adapted for reciprocation longitudinally of said pins;
   (e) a control bar arranged adjacent and parallel to said elongated portion on the side thereof opposite said one side;
   (f) said plunger of each of said pins extending through said elongated portion from said one side to said opposite side thereof;
   (g) said control bar extending between and being joined to said plunger of each of said pins on said opposite side;
   (h) said plungers in the locked condition of said pins being spring urged toward said control bar whereby said handle may be grasped and said control bar pressed simultaneously with one hand to unlock said pins.

2. The invention as defined in claim 1 wherein said locking means of each of said pins comprises a plurality of locking balls adapted to protrude laterally of said pins in the locked position and withdrawn from the locked position to an unlocked position.

3. The invention as defined in claim 1 including means for adjusting the projecting length of said pins from said one side of said portion.

4. The invention as defined in clair 3 wherein said adjusting means comprises a plurality of clamping nuts threadedly engaging each of said pins.

5. The invention as defined in claim 1 including means carried by said frame for attaching said device to an article to be mounted on a supporting surface.

6. The invention as defined in claim 5 wherein said frame comprises a leg portion at each end of said elongated body portion disposed substantially parallel with said pins, said attaching means comprising a flange joined perpendicularly to each of said legs.

7. The invention as defined in claim 5 including an article attached to said attaching means of said frame, said article being mounted on a supporting surface by said device, said supporting surface having a plurality of holes therein corresponding to and receiving said plurality of pins, said locking means of said pins preventing withdrawal of said pins from said holes.

References Cited

UNITED STATES PATENTS

| 3,148,476 | 9/1964 | Ethridge | 220—94 X |
| 3,307,759 | 3/1967 | Fulton | 224—50 X |
| 3,405,965 | 10/1968 | Haas | 294—94 X |

ROY D. FRAZIER, Primary Examiner

J. F. FOSS, Assistant Examiner

U.S. Cl. X.R.

220—94; 224—50